United States Patent [19]

Macco

[11] Patent Number: 4,633,397
[45] Date of Patent: Dec. 30, 1986

[54] UNION MEMBER ACCOUNTS MANAGEMENT SYSTEM

[76] Inventor: Richard Macco, 102 Warren Dr., Aberdeen, N.J. 07747

[21] Appl. No.: 685,986

[22] Filed: Dec. 24, 1984

[51] Int. Cl.$^4$ .......... G06F 15/30; G06F 15/21
[52] U.S. Cl. .......... 364/406; 364/401; 364/408
[58] Field of Search .......... 364/400–401, 364/406, 408, 200 MS File, 900 MS File, 300; 235/379–382, 382.5

[56] References Cited

U.S. PATENT DOCUMENTS

| | | | |
|---|---|---|---|
| 3,648,020 | 3/1972 | Tateisi et al. | 364/406 X |
| 3,719,927 | 3/1973 | Michels et al. | 364/406 X |
| 4,001,568 | 1/1977 | Iizuka et al. | 364/406 X |
| 4,016,405 | 4/1977 | McCune et al. | 235/380 |
| 4,017,837 | 4/1977 | Lansing et al. | 364/900 X |
| 4,109,238 | 8/1978 | Creekmore | 235/379 |
| 4,225,779 | 9/1980 | Sano et al. | 235/379 |
| 4,404,649 | 9/1983 | Nunley et al. | 364/900 |
| 4,485,300 | 11/1984 | Peirce | 235/380 |

OTHER PUBLICATIONS

"Portfolio of Cash Management Services", N, S, & T Bank, Mar. 1983.

Primary Examiner—Gary V. Harkcom
Attorney, Agent, or Firm—Jason Lipow

[57] ABSTRACT

A system for supervising one or more individual member accounts comprising a first data file for storing information characterizing each employer, a second data file for storing information characterizing each union member, and password protected provisions for manually updating each of these first and second data files. Each of the accounts are represented by an account module provided with an account processor, an account storage, and an account entry unit and each account module is in communication with the first and second data files. The system allows limited access to each account while utilizing central files characterizing each employer and union member.

5 Claims, 2 Drawing Figures

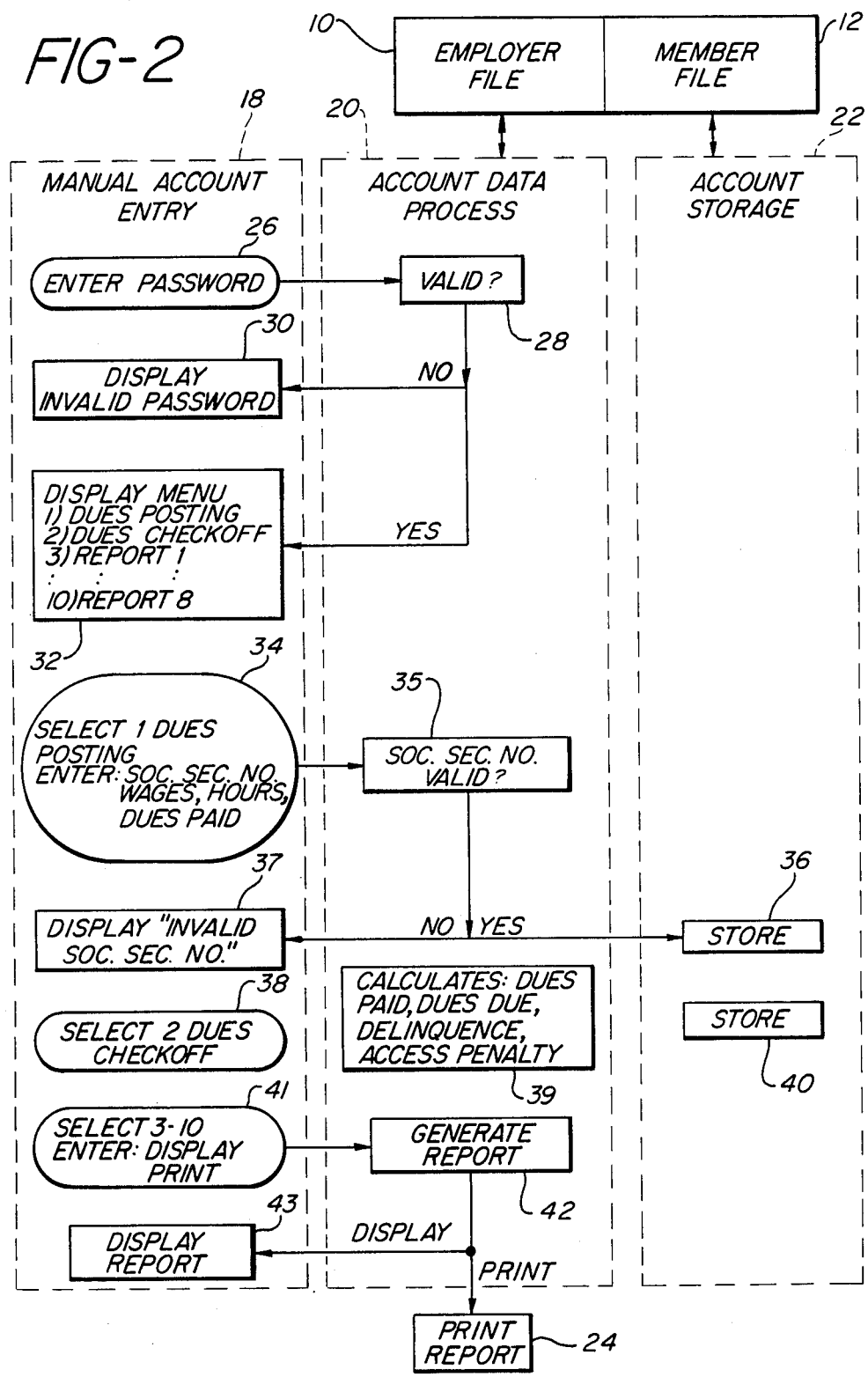

UNION MEMBER ACCOUNTS MANAGEMENT SYSTEM

This invention relates to labor union mangement systems and more particularly to a system for receiving transactions, generally in the form of money payments from either individual union members, employers of union members, or both and allocating such transactions into various member accounts in accordance with a formula provided in a collective bargaining agreement between the union members and their individual employers.

Typically, collective bargaining agreements are negotiated between a union local and such employer of members of that local and provide for collection and contribution of funds for various accounts for the benefit of the employees. For example, such an agreement may provide for the employer to withhold union dues from the paycheck of his employees and transmit such withheld union dues to the local. In some agreements no such obligation is imposed upon the employer and, instead, it is the responsibility of the union member to pay such union dues to the local. The local, in receiving such dues must make proper postings to the dues account of the individual member, generate reports, assess delinquency charges and keep proper balances of each member's dues account. The process is further complicated in that the calculation of the dues to be paid, as distinguished from the source of such dues, is also a function of the collective bargaining agreement. Most commonly such dues are simply a flat rate per unit time, e.g., ten dollars per month. In some cases, however, such dues are calculated as a function of the hours worked per unit time or the wages earned per unit time. In some rare cases, the formula for dues calculated may itself vary with time so that, for example, one rate may apply for the first six months of the life of a collective bargaining agreement and a second rate may apply for a second six month period. On occasion three or more step changes may occur in the life of a collective bargaining agreement.

The payment of dues is but one of a plurality of individual union member accounts which are managed by a union local in accordance with a collective bargaining agreement. Frequently, other accounts must be maintained from contributions from the employer, the employee, or both. Such accounts, for example, may include a pension account; an annuity account; various health and welfare accounts, e.g., maintenance of a strike fund, unemployment benefits, and the like; or others.

Each of these member accounts generally carry a specific formula incorporated into the collective bargaining agreement which designates the contribution of the employee and/or the union member and the method of calculation, i.e., a flat rate, a payment based on wages earned or a payment based on hours worked. Additionally, in the event that the party responsible for payment is found delinquent, the collective bargaining agreement generally provides a formula for the assessment of delinquency payments which may be a function of the amount delinquent, the time the delinquency has prevailed or other factors. Finally, as with the dues fund, the collective bargaining agreement also frequently provides for step changes in these payment and delinquency formulas as a function of the life of the contract.

It will be understood then that, daily, the local receives payments and accompanying reports from employers, payments for various funds from employees and data in general altering the character of each of the many accounts to be managed. A large number of clerks are required to handle such transactions and moreover, access to confidential personal information is needed to properly deal with these transactions. Such information is generally summarized in the collective bargaining agreement and the individual member and employer characteristics records, but each clerk responsible for only one or a few accounts need not and should not have access to such central records. Instead, only that portion needed for the clerk's area of responsibility should be accessible. Heretofore, this has required subdividing central files among individual clerks or abstracting information by union officials for use by their subordinates.

Accordingly, there is a need for a system for effectively handling individual member accounts, processing payments from members and employer, and accessing central files without widely disseminating personal and/or confidential information.

SUMMARY OF THE INVENTION

In accordance with the teachings of this invention, a system is provided which, in combination, processes and supervises one or more individual union member accounts. Such accounts comprise at least a union member dues account wherein the membership dues owed to the union local are managed. Contributions to the accounts are provided by the members and/or employers.

The system comprises a first data file magnetic storage means for storing current information characterizing each employer and including each employer's formula for contributions to a member's account and each employer's formula for delinquency in contributing to a member's account. Such formula is generally based on the employer-union collective bargaining agreement. It will be understood that, in connection with the use of the phrases "employer's formula for contribution" and "employer's formula for delinquency", such formulas may simply result in no contribution or payment of delinquency by the employer if that is in accord with the collective bargaining agreement. This situation frequently occurs in the case of a member's dues account where in accordance with the collective bargaining agreement, the member is required to pay and effect union dues payments directly to the union.

A second data file magnetic storage means is provided for storing current information characterizing each member including each member's employer, each member's formula for contribution to a member's account and each member's status, e.g., active, retired, suspended, or the like. Again, such formula may, in fact, dictate, for a given member and a given member account, that no contribution by the member is to be made. Typically, this occurs in the case of a member's pension fund.

First manual entry means for maintaining said first data file magnetic storage means are provided to maintain current the employer's data. Similarly, second manual entry means for maintaining said second data file magnetic storage means are provided to maintain current the member data.

At least one member account data file magnetic storage means for storing transactions with respect to said account is provided, e.g., a member's dues account. An account manual entry means for entering transactions from a member contribution and an employer contribution into said member account data file magnetic storage means is provided for manually entering such transactions.

For each account, operator activated account data processing means are provided for operating on the first and second data file magnetic storage means and each of the member account data file magnetic storage means to generate individual account balances for individual members and each employer and to generate account delinquencies for each member and each employer.

It can thus be seen that two central files are provided, one for employer data and one for member data and each of these central files has their respective manual updating entry means. Limited access to these entry means may be provided by a password system which could be chosen to give update access to one individual for the entire file or to many individuals, each for a limited portion of such central file.

Each of the plurality of member accounts has its own storage files, its own manual entry means and its own operator activated account data processing means, the latter of which may operate on selected portions of the central files without allowing the individual operating the operator activated account data processing means access to the entire data file or any facility for altering the same.

Accordingly, a clerk having responsibility for only one given member account, e.g., the dues account, could be given access only to the account manual entry means for the dues account and the operator activated account data processing means for the dues account and no other part of the system. Information from the central files will automatically be available to the clerk by the operator activated account data processing means, but only to the extent needed for the dues account. It can be seen therefore that the dues account clerk is effectively isolated from personal and confidential information unnecessary for that clerk's function while still having access to the information needed for the dues account function.

BRIEF DESCRIPTION OF THE DRAWINGS

The foregoing and additional features and advantages of the instant invention will become more readily apparent from the following detailed description of specific embodiments thereof presented below in conjunction with the accompanying drawing in which:

FIG. 2 is a schematic flow chart depicting the operation and components of one account, the member dues account, of the union member accounts management system of FIG. 1.

DETAILED DESCRIPTION OF THE INVENTION

Figure 1:
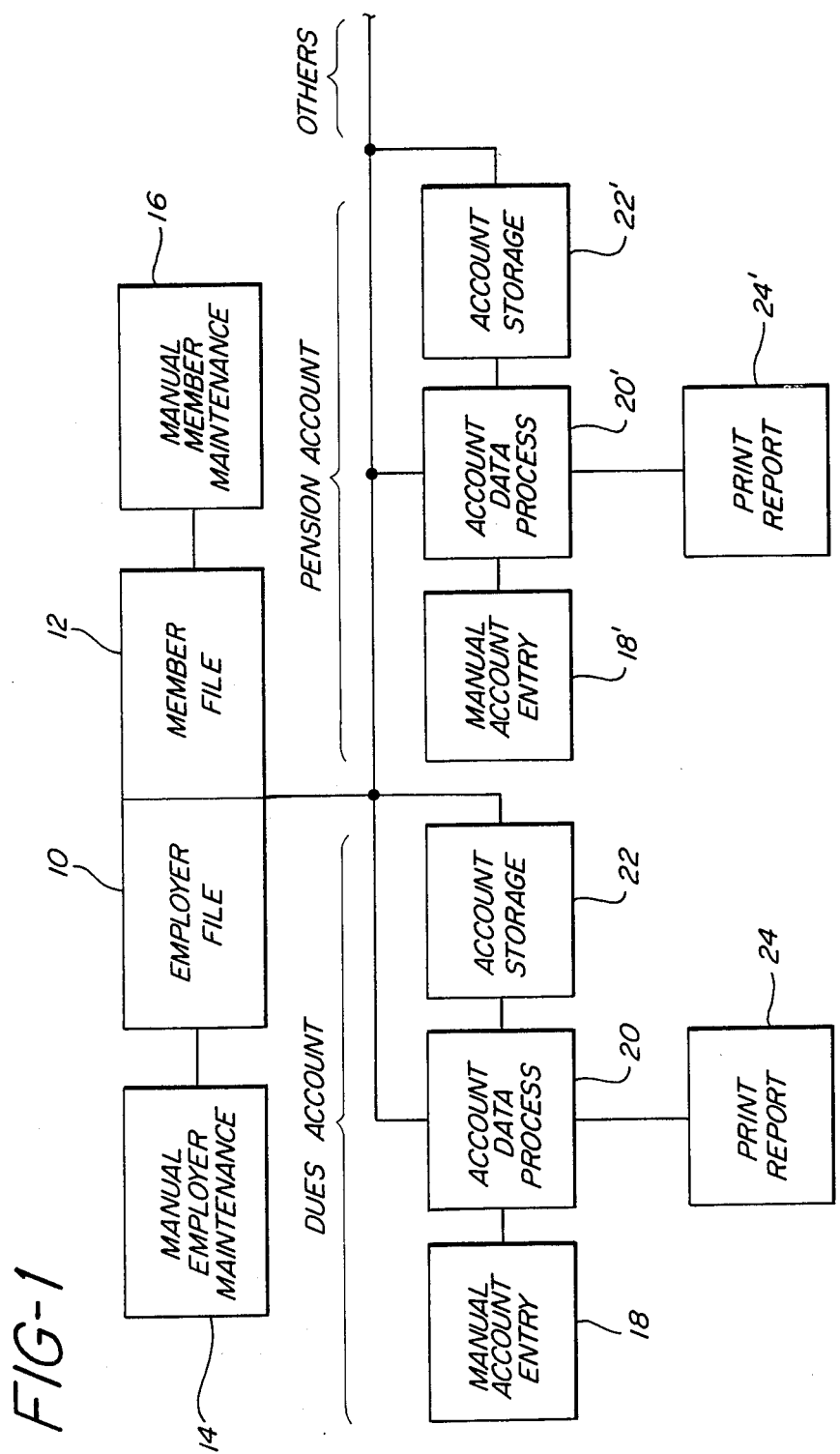
FIG. 1 is a schematic flow chart depicting the overall operation and components of the improved labor union member accounts management system of this invention.

Referring now to FIG. 1, illustrated therein, in the form of a schematic flow chart, is the overall operation and the components of the improved labor union member accounts management system of this invention.

At the center of the system resides functional blocks 10 and 12 which represent, respectively, first data file magnetic storage means for storing current information characterizing each employer and second data file magnetic storage means for storing current information characterizing each union member.

Information stored in functional block 10 may include, for example, an assigned index or code number for the employer and the basic information concerning the employer, e.g., name, address, principal or controlling officer. Of particular importance, stored in block 10 is the vital information concerning the employer's collective bargaining agreement contractual obligations with respect to each union member's account. Such information includes basics such as the starting and expiration date of the contract and the formula for employer contribution to each of the various accounts, e.g. the pension account, the benefits account and the like. As described above, such formula, as defined specifically in the collective bargaining agreement may be a flat rate, e.g., so many dollars per month or alternately may be a junction of the hours worked by the member in a given period of time or, as still another alternative, a function of the wages earned by the employee in a given period of time. The formula for each member account may also vary with time within the life of the collective bargaining agreement. For example, a three year collective bargaining agreement may require an employer to withhold five dollars per month from each union member's wages during the first year of the life of the contract, then withhold seven dollars per month from wages during the second year of the life of the contract and, finally, withhold ten dollars per month from wages during the final years of the contract. It will be appreciated that each employer may have its own unique form of collective bargaining agreement and hence its own unique formula for contribution to the member accounts. In a preferred embodiment, like contracts held by groups of employers may be given a characterizing indices to facilitate storage of the data needed to define such employers' contributions to each account.

It will be understood that all that has been described in connection with employer's contributions to a member's account applies equally to the assessment of penalties in the event of delinquency in failing to make timely contributions. The formula for such delinquency payments are again governed by the collective bargaining agreement and are stored in block 10 in the same manner as that relating to contributions.

Other useful information may be stored in block 10 including for example, year-to-date totals of contributions provided by the employer to each account, year-to-date wages paid by such employer to union members, year-to-date hours worked by union members for a given employer. Also included may be such information as an identification of the union business agent, e.g., by social security number, the date upon which the collective bargaining agreement is scheduled for renegotiation, and other like information.

Functional block 12 represents second data file magnetic storage means for storing current information characterizing each union member. Such information will include basic identifying data such as the member's social security number, union registration number, name, address, telephone number, union initiation date, starting date with the member's current union local, current local identification, immediately prior local, if any, birth date, sex, and the like. Also included in such member data storage are the members' status which may be, for example, active, deceased, expelled, pensioner, retired, suspended, withdrawn or the like.

Of particular importance, data is stored in block 12 relating to each member's formula for contributing to a given member fund or, in the case of pensions, for example, receiving benefits from a fund. Such formula may be directly or indirectly governed by the collective bargaining agreement with each of the member's employers (each member may have one or more employers) or by the union rules. For example, the collective bargaining agreement may provide for union dues to be withheld by each employer. Alternatively the agreement may not impose such an obligation on the employer and instead, the union rules provide for direct payment by the member. As in the case of the employer file, the member's file provides formula for delinquency payments with respect to each member fund.

Also stored in block 12 is an employment history recording, within a desired period of retention, the hours and wages accumulated by the member for each of his employers incuding the date range during which such hour and wages were so accumulated.

Various other data may also be included in block 12, such as for example, union voting eligibility, federal and state legislation voting districts, and the like. In a preferred embodiment, general information correlating member addresses to voting districts or member's status to voting eligibility may be provided so as to obviate the need for manual entry of these data.

Physically, data storage files 10 and 12 may be any of the well known magnetic storage devices now employed in electronic data processing, such as for example, tapes, hard discs, floppy disks, or the like, access to such stored information being governed by one or more central processing units.

Each of the first and second data storage files 10 and 12 are provided with first and second manual entry means, blocks 14 and 16, respectively. Such manual entry means may consist, for example, of a computer terminal provided with a cathode ray tube screen display to facilitate data entry. The manual entry means 14 and 16 are provided, of course, to maintain each of the files represented by blocks 10 and 12 current with respect to member and employer information. Because of the highly confidential nature of the information stored, access via entry means 14 and 16 is controlled by a password system, valid passwords being stored in each of the storage files 10 and 12. It is contemplated that common entry means may be provided for both storage means 10, 12 and accordingly it is possible that entry means 14 and 16 may physically comprise a single entry means accessible by a single identifying password. It will be understood, however, that, at the option of the local, access to either storage means 10 or 12 may be limited to different personnel and, in fact, the password system may be employed such that access to only selected parts of each storage means is available to certain personnel.

Communicating with both the member storage means 12 and the employer storage means 10 are a plurality of member account modules including at least a member dues account module. Each account module comprises a member account data file magnetic storage means for storing transactions with respect to such account, an account manual entry means for entering transactions relating to such account and an operator activated account data processing means for operating on both the central employer and member storage means and the member account data file storage means to generate individual account balances for each member and each employer with respect to such account.

Illustrated in FIG. 1 are two such member account modules; one for a dues account and the other for a pension account. Block 18 represents the due account manual entry means which again, physically, may be a computer terminal provided with a display screen. Block 20 represents the dues account data processing means which, physically may be a part of a central electronic data processing unit. Block 22 represents the dues account file storage means, which physically may be a part of an accessible tape or disk system. Block 20 may control a printer represented by block 24, to produce printed reports.

Similarly, the pension account module is provided with block 18', the pension account manual entry means; block 20', the pension account data processing means, and block 22', the pension account file storage means.

As is indicated in FIG. 1, other account modules may also be provided, such as for example, an annuity account, a general benefits account (strike fund, unemployment compensation), a health insurance account or the like.

Access to each manual account entry means is controlled by a password system wherein valid passwords may be stored in each of the account storage means and controlled by the account data processing means to allow entry to only authorized personnel. Thus, for example, the clerk responsible for the dues account may have access only to the dues account manual entry means and no other part of the system. The dues account data processing means may be programmed then to retrieve from the central employer and member storage means only such information essential to the dues account transactions and no other data residing in such central storage means. Alternatively, the password system associated with the dues account may also allow access to the central employer and member storage means and even allow limited access to the manual maintenance means 14 and 16 so that the dues clerk can modify data in these files as such data relates to the dues function. It will be understood that various other alternatives in the password system may be employed to provide levels of access to the system as dictated by the security and operation needs of the individual users of this system.

Referring now to FIG. 2, illustrated therein is a more detailed schematic flow chart depicting the operation and components of the member dues account of this management system.

The dues account manual entry means 18 is depicted in communication with the dues account data processing means 20 which is, in turn, in communication with the dues account file storage means 22, the functional block 10 comprising the first data file magnetic storage means for storing employer information, the functional block 12 comprising second data file magnetic storage means for storing current union member information and block 24 for printing reports.

A clerk seeking to access the dues account system performs the first manual entry step 26 by entering the clerk's password. Such password may be a coded series of symbols or simply the clerk's name. Process step 28 operates on the password to determine if such clerk has been provided with valid access. If not, the account data processing unit block 20 causes a display at the manual entry means 18 display step 30 such as "Invalid password". If such password is valid, the block 20 causes a display step 32 which is a menu of the various functions relating to the dues account which can be performed by the clerk in accordance with the extent of that particular clerk's access authorization. For example, such clerk may be authorized to perform such functions as posting dues received by the union from an employer, posting dues received by the union from a member, comparing dues received to those due and calculating delinquencies, i.e., a dues checkoff, causing various reports to be printed, or other such functions. The clerk's password may, for example, preclude the clerk from performing certain other functions, e.g., updating various dues information or having access to a delinquency report.

The clerk having the menu before him may next perform manual entry step 34 by selecting one of the functions and entering the necessary data for performing the selected function. For example, the clerk may select the dues posting function and preferably, upon making such selection, the block 20 will prompt the clerk as to the called for data, e.g., social security number of the member, wages earned during the posting period, hours worked, amount of dues paid, etc. Such entered data will then be processed in block 20. In the case of dues posting, for example, block 20 will operate to communicate such data to block 22, the dues account file storage means in process step 36. Prior to such movement of data, it is preferable that block 20 perform error analysis of the data received via the manual account entry step. For example, block 20 may perform process step 35 and validate the social security number. If invalid, display step 37 will indicate the error to the clerk and may contain some additional information. For example, the clerk may be advised that the dues being entered are for a new member having no records in the member file 12 and may be prompted to have such a new member record generated in file 12 before continuing.

The clerk may select to perform another dues account function, e.g., a dues checkoff whereby he may enter "select 2" as illustrated in manual entry step 38. Data may be required to be entered for performing this entry step such as, for example, various options such as the time period for the checkoff, the checkoff based on a given employer or employee, for all employers or all employees, or various other selected combinations. The block 20 will then perform the calculations to determine the dues paid, the dues that should have been paid, the amount in delinquency and the delinquency penalties to be accessed, if any. Block 20 makes such calculations in process step 39 by having data access to the member file 12, the employer file 10 and the dues account file storage means 22. Such generated calculations from process step 39 are stored in process step 40 in the storage means 22.

The clerk may select various functions to result in reports in various formats based on the data stored. Such reports may be selected from the menu in manual entry step 41 which may call for the data entry as to the mode of such report, e.g., display on the cathode ray tube of the manual account entry means or hard copy via report printer 24. Block 20 acts on manual entry step 41 in process step 42 by having access to file means 10, 12, and 22 and, in accordance with entry step 41 either display the report in display step 43 or alternatively, print such report via printer 24.

I claim:

1. In combination, in a system for processing and supervising one or more individual union member accounts comprising at least a dues account, wherein contribution to said accounts are provided by members and employers; the improvement in said system comprising:

first data file magnetic storage means for storing current information characterizing each employer including each employer's formula for contribution to a member's account, each employer's formula for delinquency in contributions to a member's account;

second data file magnetic storage means for storing current information characterizing each member including each member's employer, each member's formula for contribution to a member's account, each member's status with respect to whether said member is active, retired or suspended;

first manual entry means for maintaining said first data file magnetic storage means;

second manual entry means for maintaining said second data file magnetic storage means;

at least one member account data file magnetic storage means for storing transactions with respect to said account;

account manual entry means for entering transactions from a member contribution and an employed contribution into said member account data file magnetic storage means;

operator activated account data processing means for operating on said first and second data file magnetic storage means and said member account data file magnetic storage means to generate individual account balances for individual members and each employer and to generate account delinquencies for each member and each employer; and limited access means provided to at least one of said manual entry means using a password system.

2. The system of claim 1 wherein limited access is provided to each of said manual entry means using a password system.

3. The system of claim 1 wherein said account manual entry means comprises a dues account manual entry means for posting dues and said account data processing means comprises a dues account data processing means for validating said posted dues and storing said dues in a dues account data file magnetic storage means.

4. The system of claim 3 wherein said dues account manual entry means comprises means for selecting a dues checkoff and said dues account data processing means comprises means for calculating said dues checkoff and storing sdaid calculated data in said dues account data file magnetic storage means.

5. The system of claim 3 wherein said dues account manual entry means comprises means for entering a report selection and said dues account processing means comprising means for creating said report.

* * * * *